United States Patent [19]

Tominaga

[11] Patent Number: 5,034,670
[45] Date of Patent: Jul. 23, 1991

[54] CONTROL CIRCUIT FOR ELECTROMAGNETIC ACTUATOR

[75] Inventor: Tsutomu Tominaga, Himeji, Japan

[73] Assignee: Mitsubishi Denki K.K., Tokyo, Japan

[21] Appl. No.: 504,515

[22] Filed: Apr. 4, 1990

[30] Foreign Application Priority Data

Apr. 21, 1989 [JP] Japan .................. 01-102718

[51] Int. Cl.⁵ .................. F16K 31/02; B60G 17/00
[52] U.S. Cl. .................. 318/436; 188/282;
188/299; 188/319
[58] Field of Search ............. 318/436, 538, 539, 558;
310/254, 261; 280/707, 840; 267/64.15, 64.16;
251/129.11; 188/267, 299, 319, 322.15, 322.22;
180/41; 137/625.65

[56] References Cited

U.S. PATENT DOCUMENTS

| | | | |
|---|---|---|---|
| 3,749,956 | 7/1973 | Reiss | 310/254 X |
| 4,287,457 | 9/1981 | Takemura | 318/133 |
| 4,526,401 | 7/1985 | Kakizaki et al. | |
| 4,527,676 | 7/1985 | Emura et al. | 188/319 X |
| 4,639,627 | 1/1987 | Takekoshi et al. | 310/261 X |
| 4,752,707 | 6/1988 | Morrill | 310/254 X |
| 4,815,575 | 3/1989 | Murty | 188/299 |
| 4,837,468 | 6/1989 | Froment | 310/254 X |
| 4,874,975 | 10/1989 | Hertrich | 310/254 X |
| 4,926,983 | 5/1990 | Taubitz et al. | 251/129.11 X |

FOREIGN PATENT DOCUMENTS 62-24850 6/1987 Japan .

Primary Examiner—Bentsu Ro
Attorney, Agent, or Firm—Sughrue, Mion, Zinn, Macpeak & Seas

[57] ABSTRACT

An actuator comprises a housing; a permanent magnet arranged in the housing to be rotatable; an output shaft coupled to the permanent magnet; a stator fixed in the housing in such manner to be separated from the outer peripheral surface of the permanent magnet in diametrical directions, the stator having its inner peripheral surface provided with alternately projections and spaces; coils on the stator, and excitation switching means for switching the excitation of the coils; wherein the number of the projections and the number of the spaces in the stator is three times that of the pole pairs of the permanent magnet, and wherein the excitation switching means is connected to the coils so that the magnetic field which attracts the permanent magnet is developed by the coils which lie at the respective sides of the space opposite to the magnetic pole reversing portion of the permanent magnet, the space being corresponding to the position where the magnetic pole reversing portion of the permanent magnet is desired to stop after the permanent magnet has started to rotate.

7 Claims, 6 Drawing Sheets

CONTROL CIRCUIT FOR ELECTROMAGNETIC ACTUATOR

BACKGROUND OF THE INVENTION

1. Field of the Invention

The present invention relates to a control circuit for an actuator, and more particularly to a control circuit for an actuator which is used to switch the area of an oil passage in a shock absorber of a variable damping force type suspension system.

2. Discussion of Background

Various actuators have been devised heretofore to adjust the rotational position of a switching rod of a variable damping force type shock absorber for vehicles. One known arrangement as disclosed in e.g. Japanese Examined Utility Model Publication No. 24850/1987 is to include a bar-shaped permanent magnet which is fixed to an output shaft of an actuator, and a stator which has a plurality of pairs of electromagnets arranged so as to be circumferentially spaced from each other outside of the opposite ends of the permanent magnet, the electromagnets in each pair being symmetrically positioned to each other with respect to the center of the output shaft. One pair of the electromagnets is selectively excited to attract the permanent magnet, thereby rotating the output shaft.

As stated above, the conventional actuator has such an arrangement that one pair of the electromagnets which are arranged at the position where the permanent magnet is desired to stop are excited in the direction of attracting the permanent magnet, thereby to stop the permanent magnet by magnetic attraction. Such arrangement creates a problem wherein it is difficult to stop precisely the permanent magnet just at a desired stopping position due to a decrease in torque at a location adjacent to the desired stopping position, and a friction load of the shock absorber.

SUMMARY OF THE INVENTION

It is an object of the present invention to resolve the problem and to provide a new actuator capable of improving stopping the position accuracy of the permanent magnet and of, for example, switching the oil an area of passage in a shock absorber at higher accuracy.

The foregoing and other objects of the present invention have been attained by providing an actuator comprising a housing; a permanent magnet arranged in the housing to be rotatable; an output shaft coupled to the permanent magnet; a stator fixed in the housing in such manner to be separated from the outer peripheral surface of the permanent magnet in diametrical directions, the stator having its inner peripheral surface alternately provided with projections and spaces; coils wound on the stator, and excitation switching means for switching the excitation of the coils; wherein the number of the projections and the number of the spaces in the stator are three times that of the pole pairs of the permanent magnet, and wherein the excitation switching means is connected to the coils so that the magnetic field which attracts the permanent magnet is developed by the coils which lie at the respective sides of the space opposite to the magnetic pole reversing portion of the permanent magnet, the space being corresponding to the position where the magnetic pole reversing portion of the permanent magnet is desired to stop after the permanent magnet has started to rotate.

In accordance with the present invention, even if after having started to rotate the permanent magnet stops so as to deviate from the center of a target space of the stator which the reversing portion of the permanent magnet desires to confront, a magnetic pole of the stator is partially opposite to a magnetic pole of the permanent magnet having the same polarity as the magnetic pole of the stator so as to produce a rotating torque by a repellant force caused by the confrontation of the same poles, thereby correcting the stopping position of the permanent magnet, and thus returning the permanent magnet to the target stopping position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
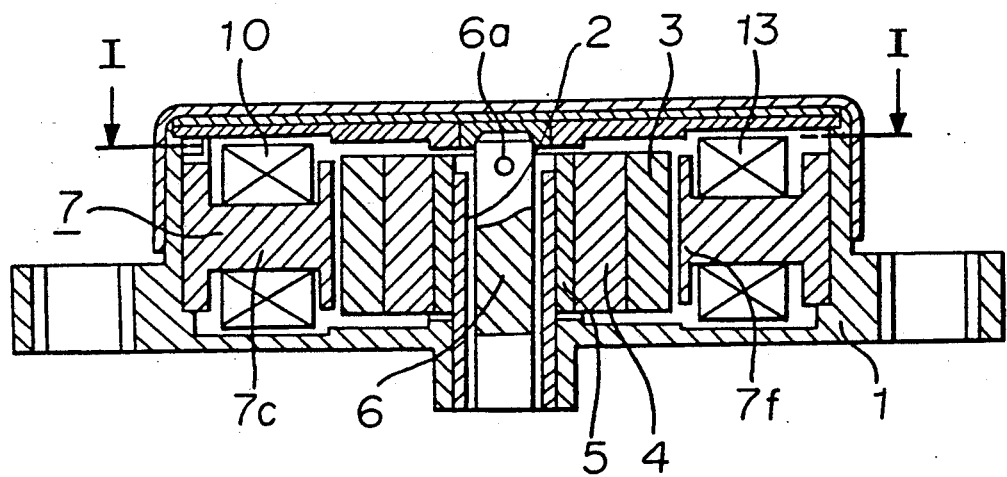
FIG. 1 is an axial sectional view of an embodiment of the actuator according to the present invention.
Figure 2:
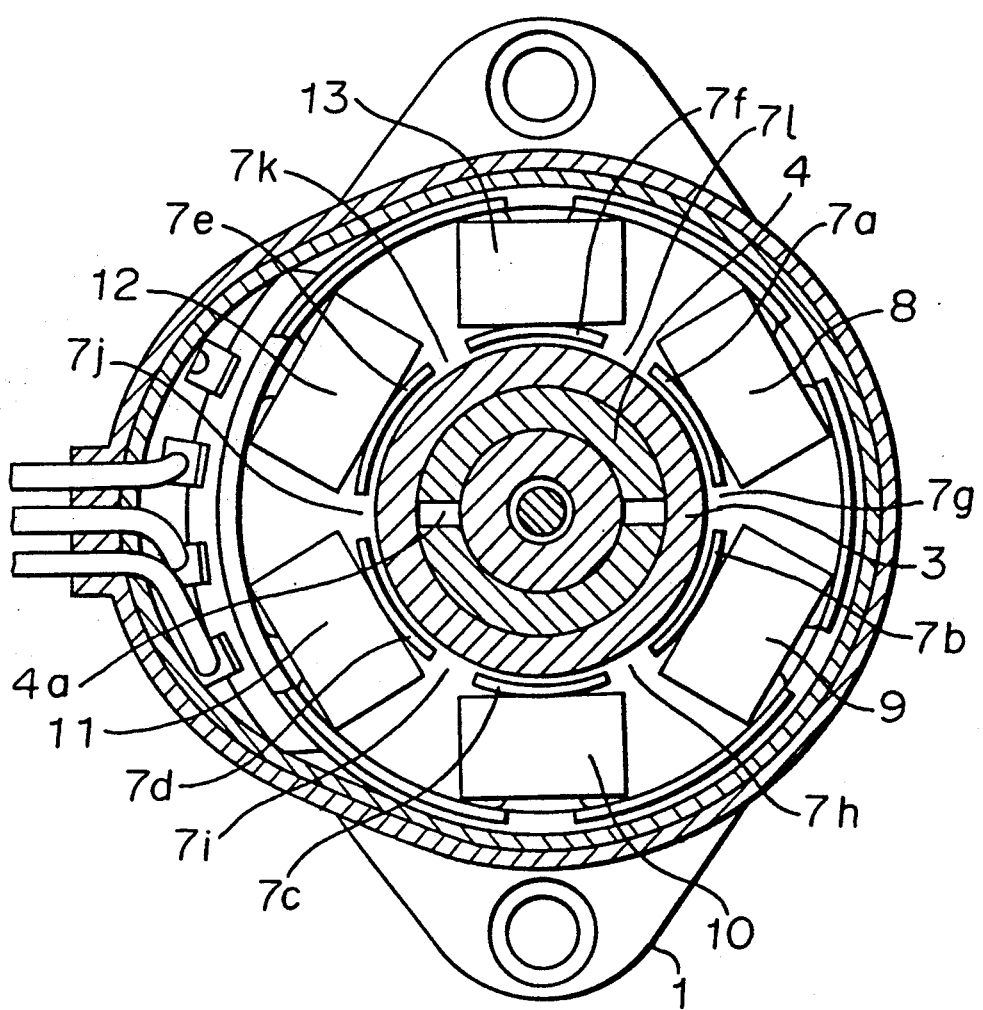
FIG. 2 is a sectional view taken along the line I—I of FIG. 1.
Figure 3:
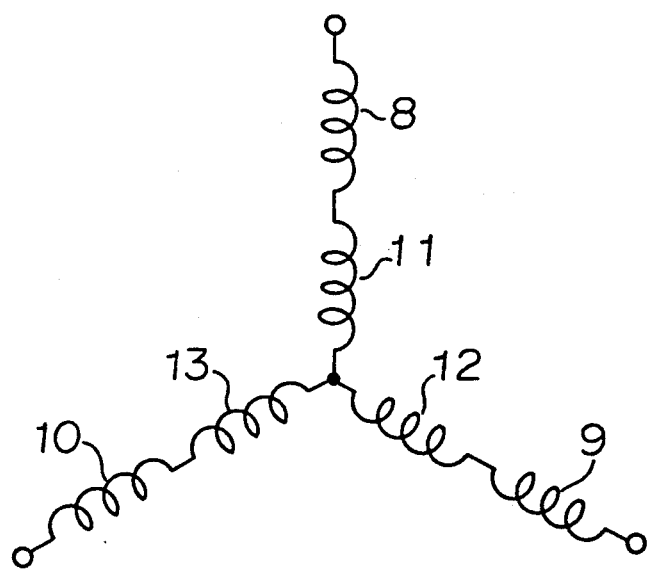
FIG. 3 is a schematic diagram showing the electrical connection of coils in the embodiment.
Figure 4:
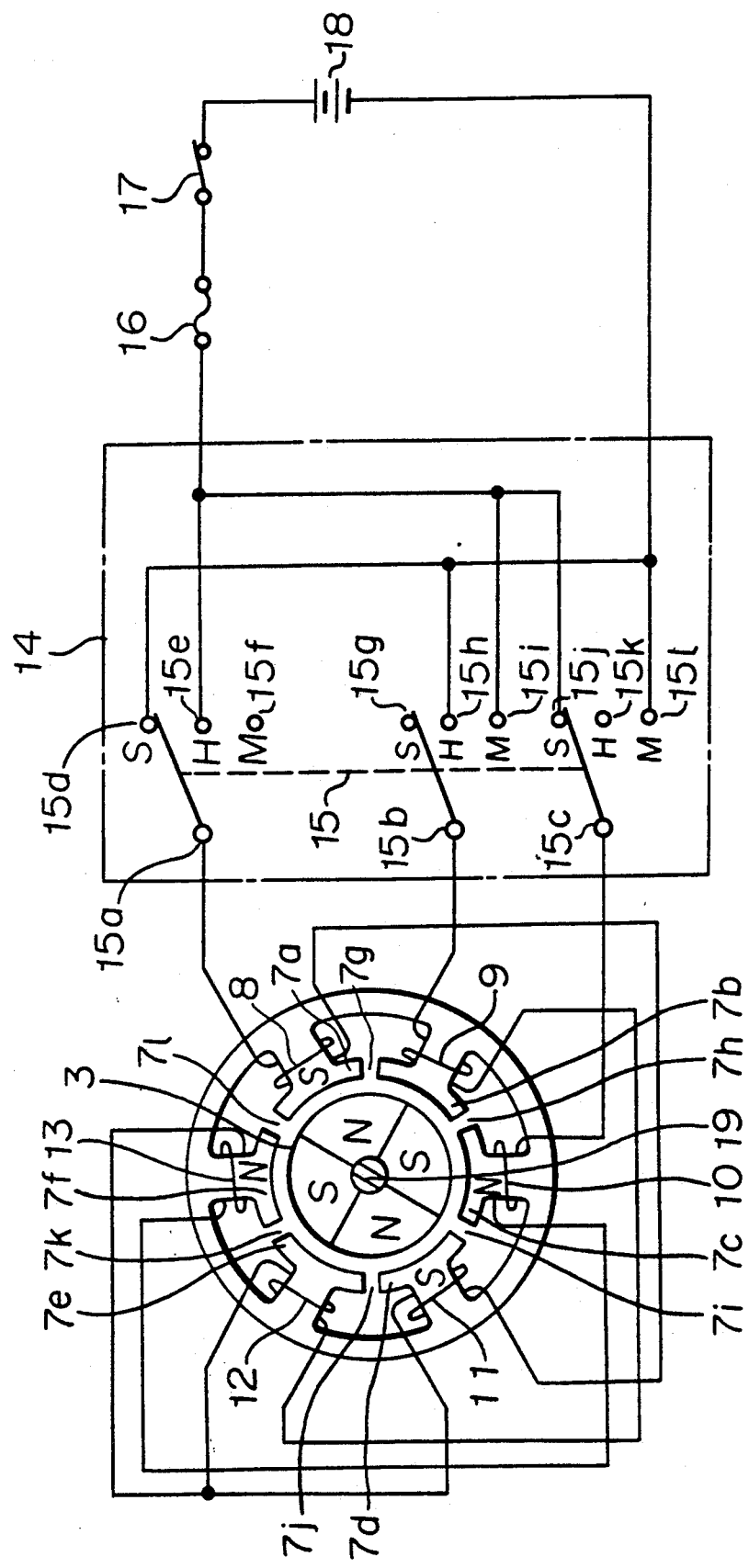
FIG. 4 is a schematic diagram to help explain the operation of the embodiment at a soft mode.

Referring now to the drawings, wherein like reference numerals designate identical or corresponding parts throughout the several views, and more particularly to FIGS. 1 and 2 thereof, there is shown the structure of an embodiment of the actuator according to the present invention which can adjust the rotational position of a switching rod in a variable damping force type shock absorber. The actuator has a housing 1 which has a hollow shaft 2 fixed at its center. A yoke 4 which supports a permanent magnet 3 magnetized in two pairs of bipolar arrangement (four-pole arrangement) is fixed on a bearing 5 around the fixed shaft 2 so that the yoke is rotatably supported by the shaft 2 through the bearing 5. The permanent magnet 3, the yoke 4 and the bearing 5 are combined to constitute a rotor of the actuator. In addition, there is an output shaft 6 which passes through the fixed shaft 2 with a predetermined gap between the outer peripheral surface of the output shaft 6 and the inner peripheral surface of the fixed shaft 2. The output shaft 6 has its one end fixed to a pin 6a. The pin 6a is engaged with a groove 4a which is formed in the end surface of the yoke 4 in a diametrical direction. In this manner, the output shaft 6 is coupled to the yoke 4. On the other hand, a stator 7 is fixed in the housing 1 to be separated from the outer peripheral surface of the permanent magnet 3 in diametrical directions. The stator 7 is provided with six projections 7a, 7b, 7c, 7d, 7e and 7f circumferentially spaced, and spaces 7g, 7h, 7i, 7j, 7k and 7l between adjoining projections. The projections 7a to 7f have a first to a sixth coil 8, 9, 10, 11, 12 and 13 wound thereon, respectively, to constitute six electromagnets. As shown in FIG. 3, the coils 8 to 13 are connected so that the first coil 8 wound on the first projection 7a is in series with the fourth coil 11 wound on the fourth projection 7d diametrically opposite to the first projection 7a, that the second coil 9 wound on the second projection 7b is in series with the fifth coil 12 wound on the fifth projection 7e diametrically opposite to the second projection 7b, and that the third coil 10 wound on the third projection 7c is in series with the sixth coil 13 wound on the sixth projection 7f diametrically opposite to the third projection 7c. As shown in FIGS. 4 thorough 6, the first, second and third coils 8, 9 and 10 can be connected to a battery 18 through an excitation switching device 14, a fuse 16 and an ignition switch 17.

Figure 5:
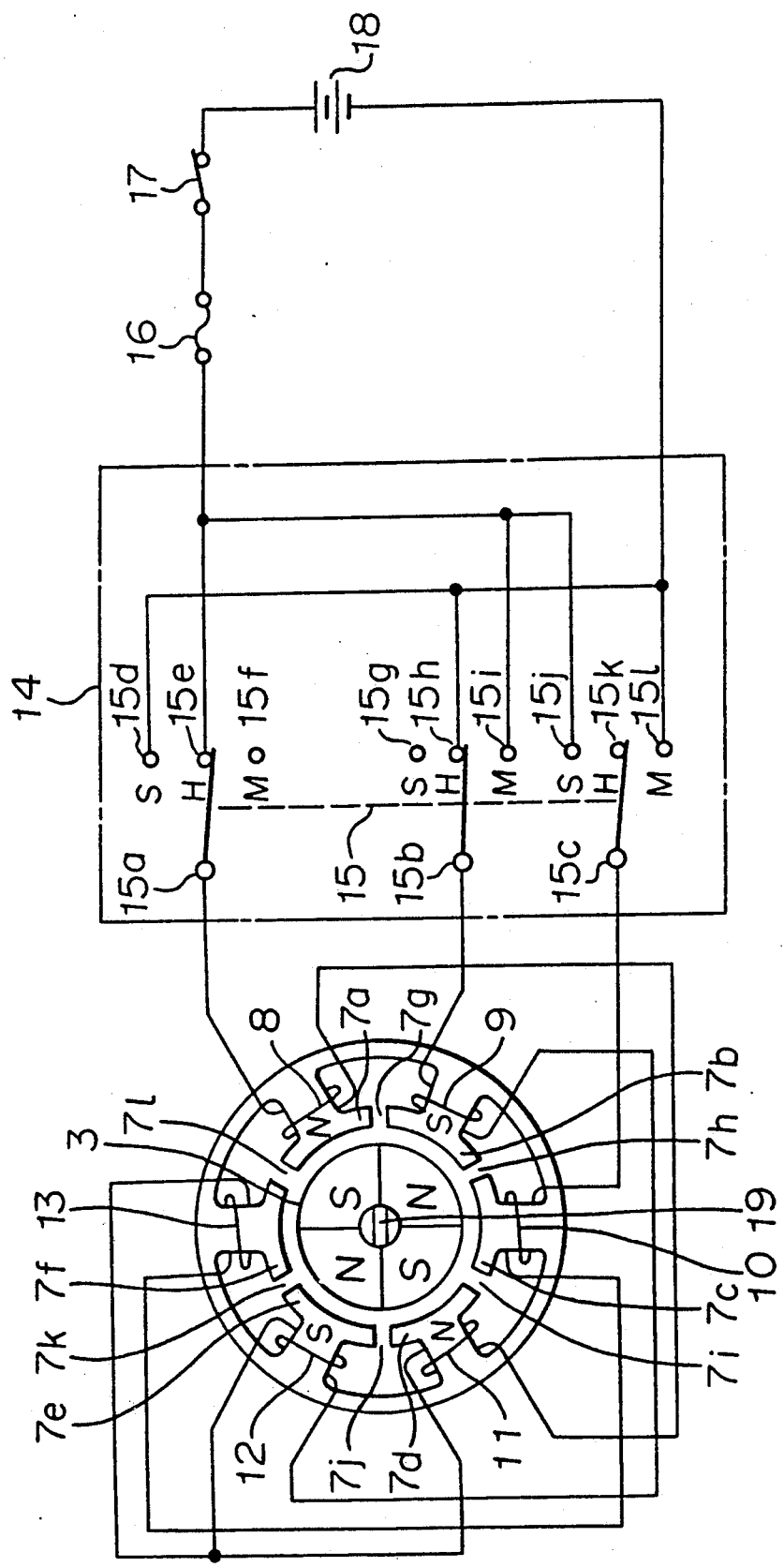
FIG. 5 is a schematic diagram to help explain the operation of the embodiment at a hard mode.
Figure 6:
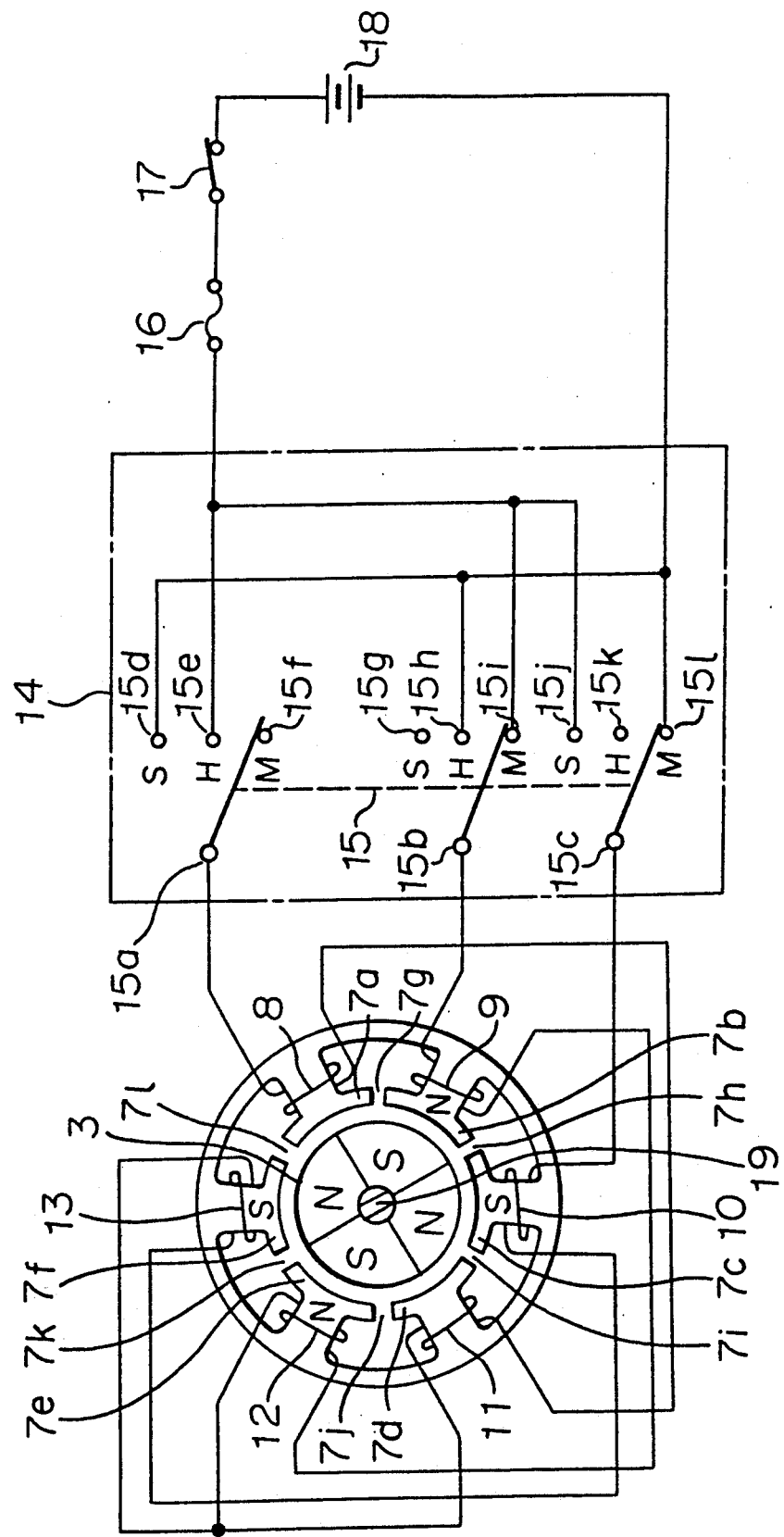
FIG. 6 is a schematic diagram to help explain the operation of the embodiment at a medium mode.

The excitation switching device 14 includes a selection switch 15 which has three movable contacts, i.e., a first movable contact 15a, a second movable contact 15b and a third movable contact 15c. The selection switch 15 is to switch the damping force of the shock absorber to either a hard mode H, a medium mode M, or a soft mode S. The selection switch 15 is so constructed that the first movable contact 15a can be switched to connect three fixed contacts 15d, 15e and 15f, that the second movable contact 15b can be switched to connect three fixed contacts 15g, 15h and 15i, and that the third movable contact 15c can be switched to connect three fixed contacts 15j, 15k and 15l, the movable contacts 15a–15c being preferably interlocked with one another on switching. In the embodiment, when the selection switch 15 is switched to connect the three movable contacts 15a, 15b and 15c to their corresponding first fixed contacts 15d, 15g and 15j as shown in FIG. 4, the soft mode S is obtained. When the selection switch is switched to connect the movable contacts 15a, 15b and 15c to their corresponding second fixed contacts 15e, 15h and 15k as shown in FIG. 5, the hard mode H is obtained. When the selection switch 15 is switched to connect the movable contacts 15a, 15b and 15c to their corresponding third fixed contacts 15f, 15i and 15l as shown in FIG. 6, the medium mode M is obtained. In FIGS. 4 through 6, reference numeral 19 designates the angle of the control rod of the shock absorber.

The excitation switching device 14 has the first movable contact 15a connected to the first coil 8, the second movable contact 15b connected to the second coil 9, and the third movable contact 15c connected to the third coil 10, respectively. The second fixed contact 15e connected to the first movable contact 15a, the third fixed contact 15i to the second movable contact 15b, and the first fixed contact 15j connected to the third movable contact 15c are connected to the positive terminal of the battery 18 through the fuse 16 and the ignition switch 17. The first fixed contact 15d connected to the first movable contact 15a, the second fixed contact 15h connected to the second movable contact 15b, and the third fixed contact 15l to the third movable contact 15c are connected to the negative terminal of the battery 18. The third fixed contact 15f connected to the first movable, contact 15a, the first fixed contact 15g connected to the second movable contact 15b, and the second fixed contact 15k connected to the third movable contact 15c are open.

For example, when the soft mode S of FIG. 4 is switched to the hard mode H of FIG. 5, the excitation switching device 14 connects the movable contacts 15a, 15b and 15c to the second fixed contacts 15e, 15h and 15k. As a result, current flows through the ignition switch 17, the fuse 16, the second fixed contact 15e, the first movable contact 15a, the first coil 8, the fourth coil 11, the fifth coil 12, the second coil 9, the second movable contact 15b and the second fixed contact 15h, in that order. At that time, the first projection 7a and the fourth projection 7d of the stator 7 are N poles, whereas the second projection 7b and the fifth projection 7e of the stator are S poles. If the magnetic poles of the permanent magnet 3 occupy the position of FIG. 4, the N poles of the first and fourth projections 7a and 7d and the N poles of the permanent magnet 3 repel each other. The S poles of the second projection 7b and the fifth projection 7e and the N poles of the permanent magnet 3 attract each other while the S poles of the second and fifth projections and the S poles of the permanent magnet repel each other. As a result, clockwise rotation torque is developed at the permanent magnet 3 to clockwise rotate the permanent magnet 3 and consequently the output shaft 6 which is coupled to the permanent magnet. After that, the rotation of the permanent magnet 3 stops by magnetic attraction at such position that the S poles of the permanent magnet 3 are opposite to the N poles of the first projection 7a and the fourth projection 7d, and that the N poles of the permanent magnet 3 are opposite to the S poles of the second projection 7b and the fifth projection 7e, as shown in FIG. 5. If the permanent magnet 3 overrotates by inertia, the S poles of the permanent magnet 3 and the S poles of the second and fifth projections 7b and 7e are partially opposite to each other to develop counterclockwise rotational torque at the permanent magnet 3 by the repellency between the S poles, causing the permanent magnet 3 to counterclockwise rotate. If the permanent magnet 3 overrotates in the counterclockwise direction, the permanent magnet 3 receives the repellent magnetic fields produced by the first and fourth projections 7a and 7d. In this manner, a correcting force works so that the magnetic pole reversing portions of the permanent magnet 3 lie on the line connecting the center of the space 7g for separating the first and second projections 7a and 7b of the stator 7, and the center of the space 7j for separating the fourth and fifth projections 7d and 7e.

Switching from the medium mode M to the hard mode H, from the hard mode H to the soft mode S, and from the hard mode H to the medium mode M is carried out in a similar fashion under the action of the excitation switching device.

Although the explanation of the above-described embodiment has been made for the case wherein a 60° rotation angle switching type actuator is used to make a switching operation in the variable damping force type shock absorber, the present invention is not limited to be used in shock absorbers. The present invention has a variety of applications because the actuator according to the present invention can obtain various switching angles in the configuration in which the number of the electromagnets is three times that of the pole pairs of the permanent magnets (1.5 times in the number of the poles). For example, a 120° switching type wherein the number of the pole pair of the permanent magnet is 1 (2 in the number of the poles), and the number of the electromagnets is 3; and a 30° switching type wherein the number of the pole pairs of the electromagnet is 4 (8 in the number of the poles) and the number of the electromagnets is 12.

Although the explanation of the above embodiment has been made for the actuator wherein the permanent magnet rotates inside of the stator, the present invention is applicable to an actuator wherein the permanent magnet rotates outside of the stator, or an actuator wherein the permanent magnet is opposite to the stator in the axial direction. In each case, a similar effect can be obtained.

Although the explanation on the embodiment has been made for the excitation switching device which is of a mechanical switch type, an excitation switching device which includes an electronic circuit using a transistor and the like can be utilized to make the switching operation, obtaining a similar effect.

Obviously, numerous modifications and variations of the present invention are possible in light of the above teachings. It is therefore to be understood that within the scope of the appended claims, the invention may be practiced otherwise than as specifically described herein.

What is claimed is:

1. An actuator comprising:
   a housing,
   a permanent magnet rotatably arranged in the housing,
   an output shaft coupled to the permanent magnet,
   a stator fixed in the housing so as to be separated from the outer peripheral surface of the permanent magnet in diametrical direction, the stator having it inner peripheral surface alternately provided with projections and spaces,
   coils wound on the stator, and
   excitation switching means for switching the excitation of the coils,
   wherein the number of projections and number of spaces in the stator are three times that of the pole parts of the permanent magnet, and wherein the excitation switching means is connected to the coils so that the magnetic field which attracts the permanent magnet is developed by the coils positioned at the respective sides of the space opposite to the magnetic pole reversing portion of the permanent magnet, the space corresponding to the position where the magnetic pole reversing portion of the permanent magnet is desirably stopped after the permanent magnet has started to rotate, wherein the excitation switching means includes a plurality of movable contacts, each movable contact being selectively connectable to three fixed contacts.

2. An actuator according to claim 1, wherein the permanent magnet is magnetized to have a plurality of pairs of poles.

3. An actuator according to claim 1, wherein the projections have the coils wound thereon, respectively.

4. An actuator according to claim 1, wherein the coils are wound so that the coils on every three projections which are diametrically opposite to each other are in series.

5. An actuator according to claim 1, wherein the movable contacts are interlocked with one another in switching.

6. An actuator according to claim 1, wherein the permanent magnet is inside of the stator.

7. An actuator according to claim 1, wherein the permanent magnet is outside of the stator.

* * * * *